United States Patent
Zhu et al.

(10) Patent No.: US 8,261,312 B2
(45) Date of Patent: Sep. 4, 2012

(54) LINEAR HINT VIDEO STREAMING

(75) Inventors: Jiang Zhu, Stanford, CA (US);
Kaichuan He, San Jose, CA (US);
Dipak Punnoran Koroth, San Jose, CA (US); Jonathan Lemon, Stoughton, WI (US); Anil Thomas, Milpitas, CA (US);
Xi Xu, Castro Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 1104 days.

(21) Appl. No.: 12/163,916

(22) Filed: Jun. 27, 2008

(65) Prior Publication Data
US 2009/0327215 A1    Dec. 31, 2009

(51) Int. Cl.
*H04N 7/173* (2011.01)
(52) U.S. Cl. ............ 725/115; 725/114; 725/92; 725/116
(58) Field of Classification Search .................... 725/82, 725/91, 92, 93, 105, 114, 115, 116, 138, 725/144, 146; 375/240, 240.01, 240.15, 375/240.26; 341/50, 51, 60; 709/231
See application file for complete search history.

(56) References Cited

U.S. PATENT DOCUMENTS

| | | | | |
|---|---|---|---|---|
| 2005/0076136 | A1* | 4/2005 | Cho et al. | 709/231 |
| 2005/0083401 | A1* | 4/2005 | Mizutani et al. | 348/25 |
| 2005/0105555 | A1 | 5/2005 | Oshima | |
| 2005/0275752 | A1* | 12/2005 | Li et al. | 348/398.1 |
| 2006/0251167 | A1* | 11/2006 | Van Der Schaar et al. | 375/240.02 |
| 2007/0067477 | A1* | 3/2007 | Jones et al. | 709/230 |
| 2009/0119594 | A1* | 5/2009 | Hannuksela | 715/723 |
| 2010/0189424 | A1* | 7/2010 | Doehla et al. | 386/124 |

FOREIGN PATENT DOCUMENTS

| | | |
|---|---|---|
| WO | 9937057 A2 | 7/1999 |
| WO | 2008092960 A1 | 8/2008 |
| WO | 2008123712 A1 | 10/2008 |
| WO | 2009003683 A1 | 1/2009 |

OTHER PUBLICATIONS

Cisco Technology, Inc., International Search Report, Jun. 29, 2010, 1-4.
Cisco Technology, Inc., Written Opinion of the International Searching Authority, Jun. 25, 2009, 1-5.

* cited by examiner

*Primary Examiner* — John Schnurr
(74) *Attorney, Agent, or Firm* — Merchant & Gould

(57) ABSTRACT

A streaming file is constructed with a file header section that includes a file header object, a media data file descriptor, and an index descriptor. A hinting index section includes a first level hinting index with a linear organization corresponding to timing tick key values. A second level hinting index has a non-sequential organization corresponding to such timing tick key values. A special mark in the second level hinting index indicates that the first level hinting index must be consulted for a next timing tick key value. Such mark is positioned in the last of a sequential run of timing tick key values associated with its entries. A data section that can be put in a separate file, and it accepts media data blocks associated in sequential runs of timing tick key values as its entries. Thus hinting is provided for a non-sequential media data file.

20 Claims, 4 Drawing Sheets

LINEAR HINT VIDEO STREAMING

TECHNICAL FIELD

The present disclosure relates to video streaming, and in particular to file formats that provide linear hinting information to improve cache performance.

BACKGROUND

Before any media data can be transmitted using real-time transport protocol (RTP), such data has to be packetized according to certain rules. For example, RFC 2250 describes the rules for MPEG-1 and MPEG-2 data. In order to avoid the repetitive job of file parsing, the data can be packetized once and stored for future use. The QuickTime file format uses "hint" tracks for this purpose.

The QuickTime file format was constructed for local playback, and does not perform well in streaming applications. The QuickTime file format is non-linear, and therefore gathering data to build a single RTP packet requires several seek operations within each file. The time-to-sample, sample-to-chunk, chunk-to-offset, sample-to-size, and hint sample offset tables within the metadata all have to be consulted before the actual media data can be read. These operations lead to a very inefficient use of the system caches. For example, as a caching file grows, various tables within the metadata must be constantly updated. The metadata structures need to be kept in memory, and cannot be saved to the disk until each caching session ends. Such metadata is usually 1-2% of the media data in size, so caching multiple large files can quickly lead to the RAM itself becoming a bottleneck.

The complexity of the QuickTime file format also prevents building lightweight kernel modules for high performance streaming. What is needed is a file format that can be used as a generic container for both streaming and caching applications.

SUMMARY

An easy to parse, generic media streaming file format is suitable for high performance RTP streaming and caching. Hinting information and metadata for media files is included that improves the real-time performance of streaming requests. A hinting file has a file header section with a file header object, a media data file descriptor, and an index descriptor. A hinting index section includes a first level hinting index with a linear organization corresponding to timing tick key values. A second level hinting index has a non-sequential organization corresponding to the timing tick key values. A special mark is disposed in the second level hinting index to indicate to a streaming engine that the first level hinting index must be consulted for a next timing tick key value. The special mark is positioned in the last of a sequential run of timing tick key values associated with its entries.

The above summary of the invention is not intended to represent each disclosed embodiment. Other aspects and example embodiments are provided in the figures and the detailed description that follow.

DESCRIPTION OF EXAMPLE EMBODIMENTS

Figure 1:
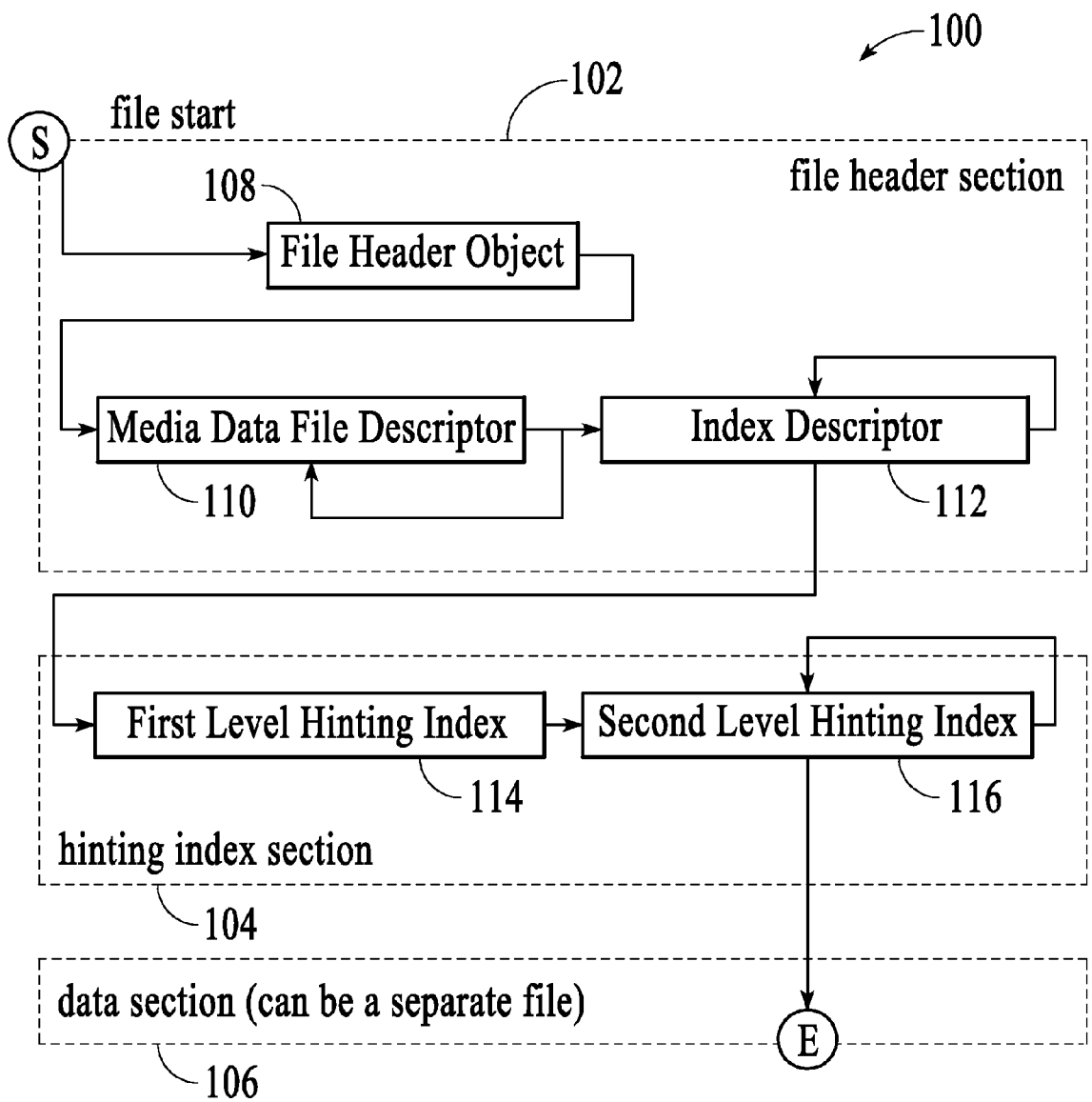
FIG. 1 is a block diagram of a streaming format file.

FIG. 1 depicts a streaming format file 100 for storing hinting information and metadata for media files that is extensible and flexible file. The streaming format file helps servers to stream requests with less real-time performance impact. The streaming format file 100 includes a file header section 102, a hinting index section 104, and a data section 106. The file header section 102 includes a file header object 108, a media data file descriptor 110, and an index descriptor 112. The index section includes a first-level hinting index 114 and a second-level hinting index 116. The data section 106 carries the actual media data and may instead be fully contained in a separate file.

The streaming format file 100 supports efficient lookup of the hinting information with multi-level sparse indexing that is independent of any particular digital media container format or transport format. In-file hinting is supported for the data stored in the streaming format file. Out-of-file hinting lookup is provided for data stored in files separate from a linear hint format (LHF) file. Multi-level linear indexing (MLI) can assist a stream engine (SE) to efficiently locate the data.

A typical hinting-process works through the hinting information to get the offset of the desired data block in the same file or a separate media data file. This lets a stream engine fetch the data that is going to be sent out in a more efficient way without first having to know the payload or the container format of the streaming media.

Dense indexing is a conventional way to organize hinting information. In dense indexing, a sequence number of data blocks, an adjusted RTP time stamp, or a normal play time (NPT), are used as the keys.

Figure 2:
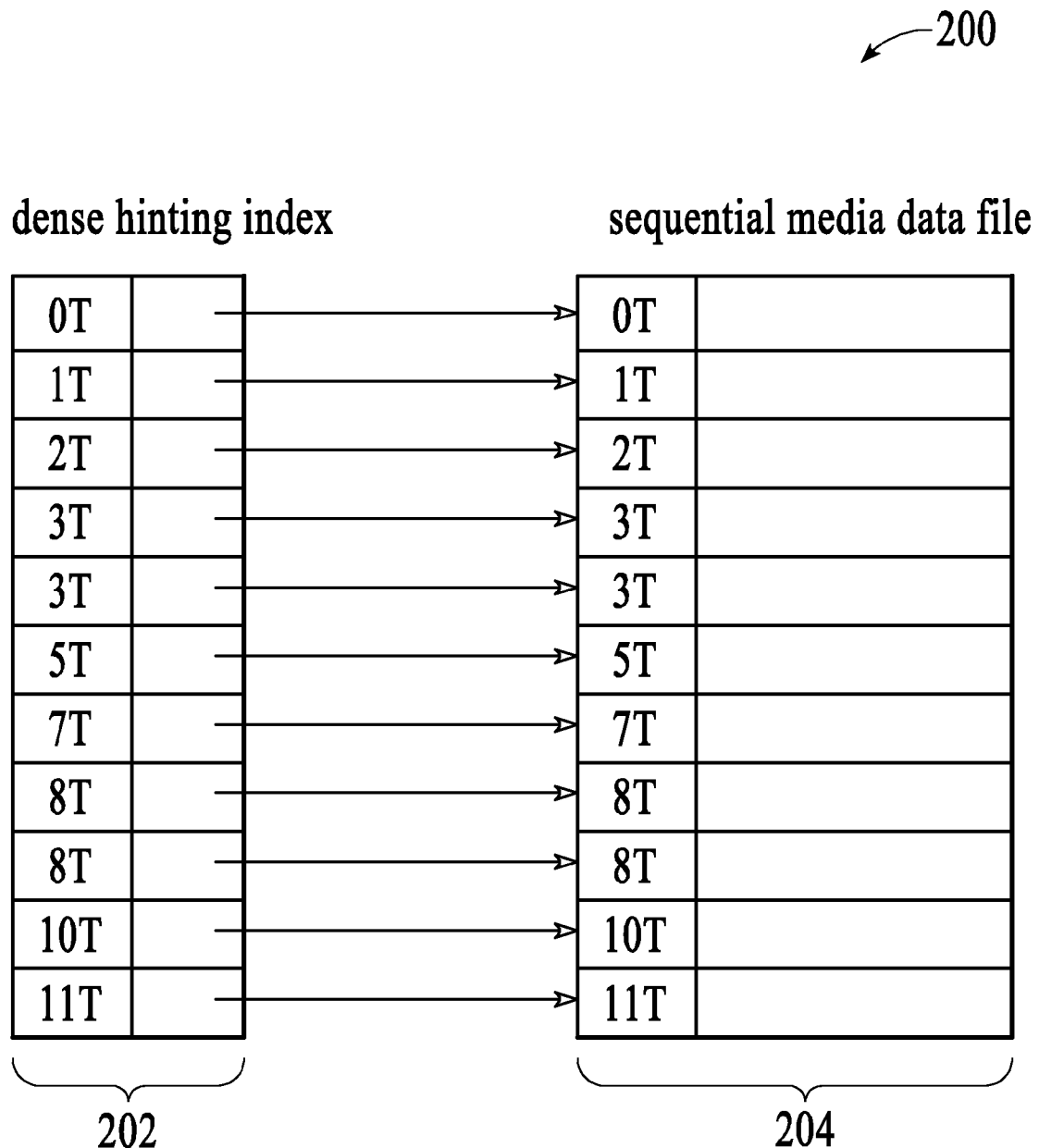
FIG. 2 is a data diagram showing how a single dense hinting index provides pointers to a sequential media data file with timing ticks 0T-11T, such as could be used in the streaming format file of FIG. 1.

An example of dense indexing is illustrated in FIG. 2. A dense hinting index 202 provides pointers to a sequential media file 204. An adjusted RTP time-stamp of the packet is used as an indexing key. A sequence {0T, 1T, 2T, 3T, 3T, 5T, 7T, 8T, 8T, 10T, 11T} in a m packet has a tick time (T) value of 3003, for example. The media data is stored sequentially in a separate file, and media data blocks (RTP packets), with the same adjusted RTP time-stamp, are packed contiguously. Usually, the media data with the adjusted RTP time-stamp is not contiguously stored. But with an offset pointer for each packet in the dense index, each block of media data can be located.

When a play request arrives within a range request (0T, ~), the stream engine looks at the dense hinting index 202, locates key "0T", and follows the offset pointer to locate the start of the media data block in the sequential media data file 204, and starts streaming one data block at a time from there.

When a request arrives with a range request not starting with 0T, e.g., trick play mode, (5T, ~), the stream engine has to go through the dense hinting index to locate the index with key value=5, and then follow the offset pointer. The dense hinting index scan is on the order of O(log (n)), if a binary search is used. If the number of data elements is large, using this method can adversely impact performance.

Figure 3:
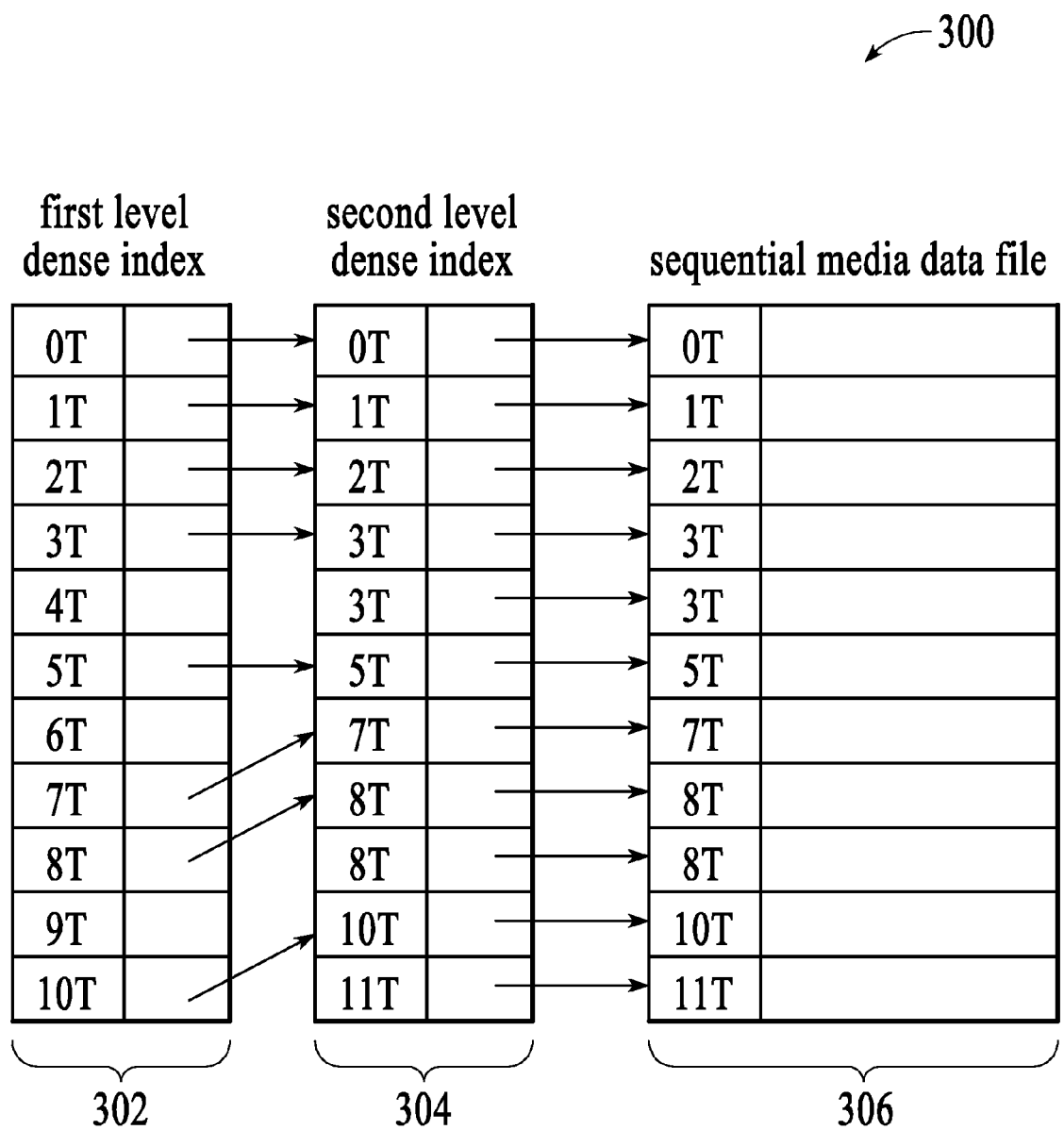
FIG. 3 is a data diagram showing how a first level dense hinting index with some unused slots provides pointers to a second level dense index, which in turn supplies pointers to a sequential media data file with timing ticks 0T-11T, such as could be used in the streaming format file of FIG. 1.

This drawback is overcome with a multi-level linear index, e.g., as represented in FIG. 3. At the first level, a linear table is used to index the adjusted RTP time-stamp. For example, such index is calculated as, Index=(requested normal play time)/Tick Where Tick=1/sample rate. For example, Tick=3003 for a sample rate of 90-kHz.

In one embodiment, it is assumed that all of the adjusted RTP time-stamps are a multiple of the tick value. If some of the adjusted RTP time-stamps are not exact multiples of the tick value, the tick value is rounded up to the nearest multiple of the tick value during the linear hinting process. A non-propagating round-up error in time is introduced thereby, but it is insignificant.

A situation can be encountered where there will be unused slots in a first level linear hinting index 302, e.g., 4T, 6T and 9T, as exemplified in FIG. 3. Each entry in the first level index 302 needs only a few bytes. So, the adjusted RTP time-stamp should have kept on being linearly increased, because the space wasted on empty slots is negligible.

In the same example as before, when the request is (5T, ~), the stream engine calculates the offset of the 5T entry and follows its offset pointer to a second level index 304. This operation can be done in O(1), a constant amount of time, and index 304 provides the start of the actual offset of a desired media data block in a sequential media data file 306.

For pre-positioned media files, the media data is sequentially placed in the file when its linear hint file 104 is generated. In a caching proxy case, the latter parts of a movie are stored near the front of a media data file 106.

The caching proxy case may initiate a request to the original server with a range request that does not start with the beginning of the movie. For example, in a movie that is sixty minutes long, there could be three time segments request, e.g., 0-20 minutes [0 m, 20 m], 40-60 minutes [40 m, 60 m], and 20-40 minutes [20 m, 40 m]. When the caching proxy is writing data into a media data file, the resulting media data file will be non-sequential. The data for the first twenty minutes, [0,20 m], request will go to a first portion of the file followed by data for the [40 m, 60 m] request, and a last portion of the file is for the [20 m,40 m] request. Three fragments of a second level index may be stored in a linear hint file in that order.

Figure 4:
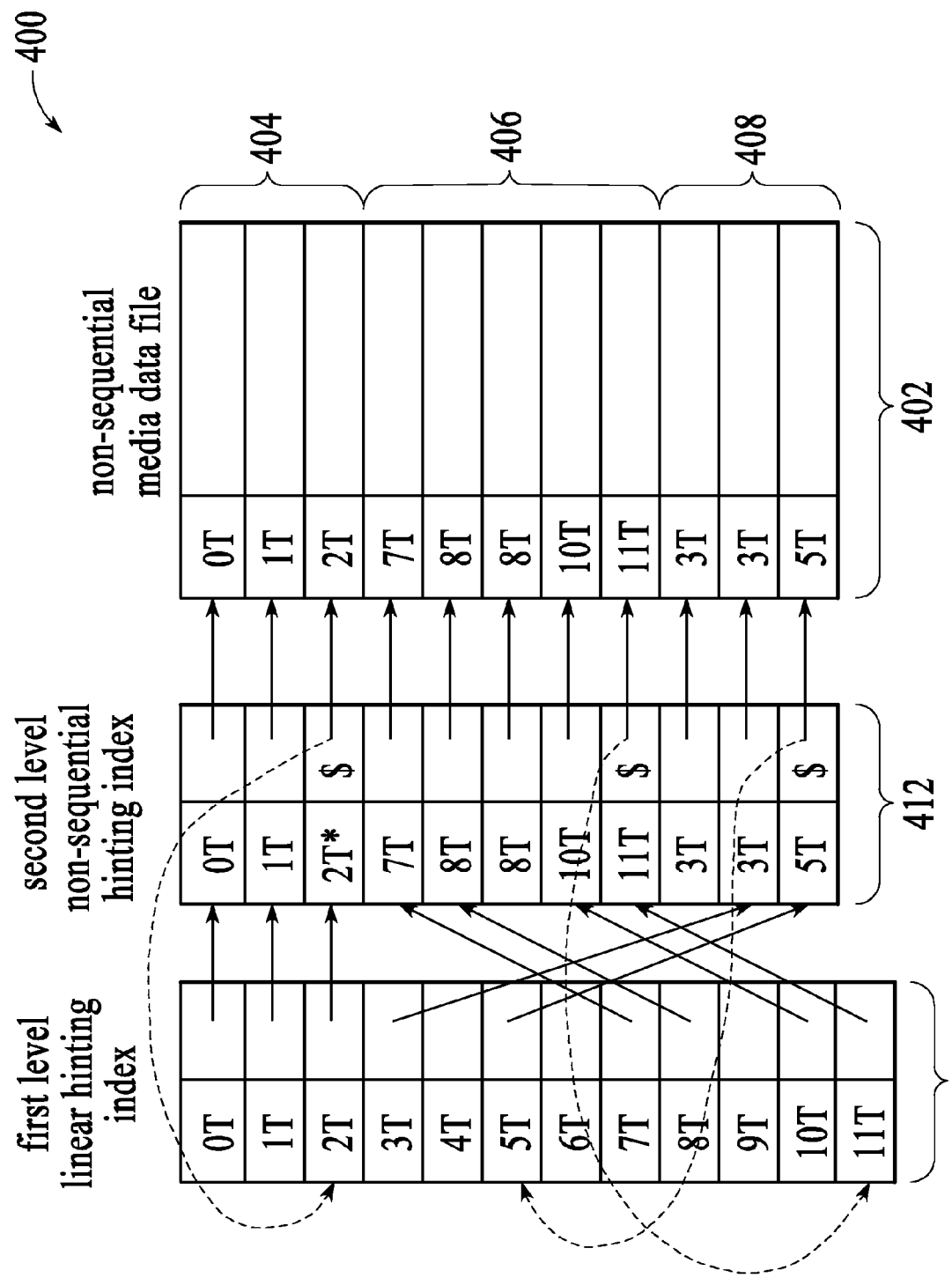
FIG. 4 is a data diagram showing how a first level linear hinting index provides pointers to a second level non-sequential hinting index with special markers ($), which in turn supplies pointers to a non-sequential media data file with timing ticks 0T-11T, such as could be used in the streaming format file of FIG. 1.

An extension of multi-level linear indexing is needed to allow non-sequential media data file indexing. FIG. 4 illustrates a media data file 402 organized in a non-sequential way such that data, e.g., for 7T~11T comes before data for 3T~5T.

The non-sequential media data file 402 can be divided into several fragments. Within each fragment, the data can exist in sequential order. The data file includes three fragments 404, 406, and 408, namely [0T,2T], [7T,11T] and [3T,5T]. An extension, represented by a dollar-sign symbol ($), tells the stream engine when to expect a jump, and when to go back to a first level linear hinting index 410 to get an index for the next time stamp. Indicating when to expect a jump or when to go back to a first level hinting index is accomplished with the special marking or flag ($) in a second level non-sequential hinting index 412.

In one embodiment, when a play request [0,~] arrives, the stream engine looks at the first level linear hinting index 410 and [0T] to get a pointer to the second level non-sequential hinting index 412. The stream engine follows the pointer to locate the corresponding 0T entry in the second level non-sequential hinting index 412, and obtains an offset address pointer to a first media data 404 having the time stamp 0T in the non-sequential media file 402. Thereafter, the stream engine can iterate through the entries in the second level non-sequential hinting index 412 to follow the offset address pointers to the media file 404. That is, until the special marking ($) in 2T is hit, similar to an end-of-file (EOF) marker. The special marking indicates that the stream engine should go back to the first level hinting index 410 to locate a second level index offset for a next adjusted RTP time-stamp.

In the example illustrated in FIG. 4, the stream engine goes back to the first level 410 and gets the offset in the second level non-sequential hinting index 412 for 3T. The offset points to another section 408 of the non-sequential media data file 402. The stream engine will continue fetching a next entry in second level non-sequential hinting index 412 until the special marking ($) at 5T is encountered.

Multiple packets can share the same real-time protocol (RTP) timestamp. The receiver time stamp (RTS) doesn't monotonically increase. In one embodiment, it may be better to use DTS or packet send time or packet number as the index into each packet, from the RTP extension header or from the output of a committed access rate (CAR) algorithm. The packet in media file/cache file could be stored in the decoding/encoding order to speed up packetization.

The time range in a RTP play request is the presentation time stamp (PTS), but can be treated as decoding time stamp (DTS) when locating the range of packets to send. To be accurate, the actual PTS in the meta information of the packet can be compared with the requested PTS range as well.

Multiple packets can share the same RTS, as long as the first packet is located with the RTS. In a cache file, the data is stored in such a way, but the same assumption cannot be made for other media file formats such as .mov and .mp4.

An additional field can be included in the file format to convey what kind of key to use in the hinting index, e.g., RTS, PTS, DTS or packet number, so as to have more flexibility The complexity can be O(1) using a dense hinting index if the dense hinting index file is separated from the original media data and a single big index file is used to store a big array. The play time in the unit of T is used directly as an index into the array. Basically, Index[t] is a pointer to the packet in the data file.

In one embodiment, space is reserved for all timestamps in the hint/index file. The file system won't actually allocate disk space until the corresponding offset is written to.

Referring again to FIG. 1, a streaming format file 100 can define multiple streams or tracks, such as one video stream/track associated with multiple audio streams/tracks. A track/stream can be further partitioned into multiple clips, with each clip containing a segment of the streaming data. Each clip has its own first level hinting index 114 and second level hinting indexes 116 pointing to actual media data.

In an embodiment, the streaming format file 100 begins with a mandatory file header object 108, as detailed in Table-I. A header extension section can be located with the file header object using the extension offset and the header length.

TABLE I

| Field name | Description | Field type | Size (bits) |
| --- | --- | --- | --- |
| Type | File Type | BYTE | 8 |
| Version | File Type version ID | BYTE | 8 |
| Header Length | Header length incl. ext header | WORD | 16 |

TABLE I-continued

| Field name | Description | Field type | Size (bits) |
|---|---|---|---|
| Extension Offset | 0: no extension header present Non-zero value: offset to the extension header section | WORD | 16 |
| Number of descriptors | Number of file header descriptors in the file header | WORD | 8 |
| Reserved 0 | Not in use for this version | DWORD | 32 |

Right after the file header object 108, there can be multiple file header descriptor objects in the form of type, length, value (TLV). Two file header descriptor objects are defined, a media data file descriptor 110, and an index descriptor 112. See Table-II.

TABLE II

| Field name | Description | Field type | Size (bits) |
|---|---|---|---|
| Object Type | File Header Descriptor Type | BYTE | 8 |
| Object Length | File Header Descriptor Length | WORD | 16 |
| Object Value | The content of the object | VOID | Variable length |

The media data file descriptor carries information about the sequential or non-sequential data file that the hinting index section will point to. For flexibility, there could be multiple media data file descriptors within a single streaming format file 100, e.g., to hint multiple data files with a single hinting index. Multiple data files with a single hinting index can be used to handle multiple clips in one movie in which those clips are stored in different media data files and to make the partial cache file handling more flexible.

A media file ID is used in the hinting index section 104 to hint to the stream engine that the offset in the index is for a particular media data file. See Table-III.

TABLE III

| Field name | Description | Field type | Size (bits) |
|---|---|---|---|
| Object Type | Media Data File Descriptor Type | BYTE | 8 |
| Object Length | Media Data File Descriptor Length | WORD | 16 |
| Media File ID | Internal File ID for this file | BYTE | 8 |
| Payload Type | RTP or UDP. This is to tell the stream engine what kind of packetization scheme it should use to process the media data in the file | BYTE | 8 |
| File Name | Null terminated string as the file name | STRING (128) | 8 × 128 |

Table-IV describes one format for an index descriptor.

TABLE IV

| Field name | Description | Field type | Size (bits) |
|---|---|---|---|
| Object Type | Index Descriptor Type | BYTE | 8 |
| Object Length | Index Descriptor Length | WORD | 16 |
| Index ID | Internal ID for this hinting index | BYTE | 8 |
| Index Level | 0: First Level N: second level | BYTE | 8 |
| Index Type | 0: Dense 1: Sparse | BYTE | 8 |

TABLE IV-continued

| Field name | Description | Field type | Size (bits) |
|---|---|---|---|
| Index Section Offset | The offset from the beginning of the file to this hinting index start | DWORD | 32 |

Session description protocol (SDP) data is on a per-movie basis, the SDP data is packed in each linear hint file for convenience. The SDP data is packed in the header section 102 in a text format, and is described in Table-V.

TABLE V

| Field name | Description | Field type | Size (bits) |
|---|---|---|---|
| Object Type | SDP Data Extension Header Type | BYTE | 8 |
| Object Length | SDP Data Header Length | WORD | 16 |
| SDP Data Length | SDP Data field length | WORD | 16 |
| SDP Data | SDP Data string | STRING (N) where N is the SDP Data Length | 8 × N |

The first-level index section 114 has the following header in Table-VI. The first-level index section is a sparse type.

TABLE VI

| Field name | Description | Field type | Size (bits) |
|---|---|---|---|
| Object Type | Index Section Type | BYTE | 8 |
| Object Length | Index Section Length | WORD | 16 |
| Index ID | Internal ID for this hinting index | BYTE | 8 |
| Index Level | 0: First Level | BYTE | 8 |
| Index Type | 1: Linear Dense, no duplications | BYTE | 8 |
| Entry Type | Each entry is a fixed size structure. Type itself imply size. Also what is used as KEY is also implied. | BYTE | 8 |
| First Level Index Data | Index Data structure | VOID | Variable length |

Entry type in the first-level index section header determines what type of data structure is used as the index data. For example, two entry types, Type 1. First-level Linear Index, and Type 2: second level dense index.

Type 1 index data format is specified in Table-VII.

TABLE VII

| Field name | Description | Field type | Size (bits) |
|---|---|---|---|
| Key | Index key. Normally the starting adjusted RTP timestamp for the first media data is used | WORD | 16 |
| File ID | The media data file ID for this range | BYTE | 8 |
| Second-Level Offset | The offset pointer to the second-level index | DWORD | 32 |

Table-VIII details a second-level index section header.

TABLE VIII

| Field name | Description | Field type | Size (bits) |
|---|---|---|---|
| Object Type | Index Section Type | BYTE | 8 |
| Object Length | Index Section Length | WORD | 16 |
| Index ID | Internal ID for this hinting index | BYTE | 8 |
| Index Level | N: second level | BYTE | 8 |
| Index Type | 0: Dense, with duplications 1: Sparse | BYTE | 8 |
| Number of Index Entries | Number of index entries in this second-level index | DWORD | 32 |
| Entry Type | Each entry is a fixed size structure. Type itself imply size | BYTE | 8 |
| Second Level Index Data | Index Data structure | VOID | Variable length |

A second level dense index is used as the only second-level index. There could be multiple second level dense index sections in a streaming format file 100. For this section, type-2 is used as the data format. Type-2 index data format is, as in Table-IX.

TABLE IX

| Field name | Description | Field type | Size (bits) |
|---|---|---|---|
| Key | Index key. Normally the starting RTP Time stamp for the first media data is used | WORD | 16 |
| Media Data File Offset | The offset pointer to the actual media file | QWORD | 64 |
| PTS | Presentation Time Stamp. Should be the same to RTP Time Stamp most of the time | DWORD | 32 |
| DTS | Decoding Time Stamp | | |
| TX TS | Transmission Time Stamp | DWORD | 32 |
| Packet Number | Packet count | DWORD | 32 |
| Sequence Number | Packet sequence number if any | WORD | 16 |
| Frame Type | Frame types: I, B, P, $ $ sign imply this is the last entry for this second-level dense index. Client should go back to first level to do a search again. | BYTE | 8 |
| Reserved Filed | Reserved for further extensions: BitMap, Cache state, etc | WORD | 16 |

Actual packet data may follow header objects and tables, if the data is stored in the same streaming format file 100. When packet data is stored in a separate file, the data can be stored in its original file format (like a QT mov file), or the data can be stored in a packet data dump file.

While several particular example embodiments have been described, those skilled in the art will recognize that many changes may be made thereto without departing from the spirit and scope of the invention, which is set forth in the following claims.

What is claimed is:

1. A method for linear hinting in streaming media data files, comprising:
    configuring a first level linear hinting index with pointers to a second level non-sequential hinting index;
    providing said second level non-sequential hinting index with pointers to a non-sequential media data file; and
    searching for media data blocks in said non-sequential media data file by accessing said first level linear hinting index to get a pointer to said second level non-sequential hinting index which in turn provides a final pointer to a particular media data block in said non-sequential media data file.

2. The method of claim 1, further comprising:
    not first consulting said first level linear hinting index for a next access; and
    obtaining a next media data block in said non-sequential media data file by accessing only a next entry in said second level non-sequential hinting index to fetch a corresponding pointer to said next media data block in said non-sequential media data file.

3. The method of claim 1, further comprising:
    marking a discontinuity in the order of said media data blocks in said non-sequential media data file with a special character placed in a corresponding pointer to a last continuous media data block in said second level non-sequential hinting index.

4. The method of claim 3, further comprising:
    if said special character was not obtained in a last access, obtaining a next media data block in said non-sequential media data file by accessing only a next entry in said second level non-sequential hinting index to fetch a corresponding pointer to said next media data block in said non-sequential media data file, and not first consulting said first level linear hinting index;
    otherwise, returning to search for media data blocks in said non-sequential media data file by accessing said first level linear hinting index to get a pointer to said second level non-sequential hinting index which in turn provides a final pointer to a particular media data block in said non-sequential media data file.

5. The method of claim 1, further comprising:
    packing said first level linear hinting index and said second level non-sequential hinting index together in a single file with a media file descriptor; and
    associating at least one separate media data file.

6. The method of claim 1, further comprising:
    packing said first level linear hinting index and said second level non-sequential hinting index together in a single file with a media file descriptor, and at least one non-sequential media data file.

7. The method of claim 1, further comprising:
    organizing an index section is such that said first level linear hinting index has a linear organization corresponding to timing tick key values.

8. The method of claim 1, further comprising:
    organizing an index section is such that said second level hinting index has a non-sequential organization corresponding to timing tick key values.

9. The method of claim 1, further comprising:
    organizing an index section is such that said second level hinting index includes a special mark in the last of a sequential run of timing tick key values associated with its entries.

10. The method of claim 1, further comprising:
    organizing a data section is such that it accepts media data blocks associated in sequential runs of timing tick key values as its entries.

11. An apparatus, comprising:
    a memory storage; and
    a processing unit coupled to the memory storage, the processing unit being configured to:
    configure a first level linear hinting index with pointers to a second level non-sequential hinting index;
    provide said second level non-sequential hinting index with pointers to a non-sequential media data file; and search for media data blocks in said non-sequential media data file by accessing said first level linear hinting index to get a pointer to said second level non-sequential hinting index which in turn provides a final pointer to a particular media data block in said non-sequential media data file.

12. The apparatus of claim 11, further comprising the processing unit being configured to obtain a next media data block in said non-sequential media data file by accessing only a next entry in said second level non-sequential hinting index to fetch a corresponding pointer to said next media data block in said non-sequential media data file.

13. The apparatus of claim 11, further comprising the processing unit being configured to mark a discontinuity in the order of said media data blocks in said non-sequential media data file with a special character placed in a corresponding pointer to a last continuous media data block in said second level non-sequential hinting index.

14. The apparatus of claim 13, further comprising the processing unit being configured to:
if said special character was not obtained in a last access, obtain a next media data block in said non-sequential media data file by accessing only a next entry in said second level non-sequential hinting index to fetch a corresponding pointer to said next media data block in said non-sequential media data file, and not first consulting said first level linear hinting index;
otherwise, returning to search for media data blocks in said non-sequential media data file by accessing said first level linear hinting index to get a pointer to said second level non-sequential hinting index which in turn provides a final pointer to a particular media data block in said non-sequential media data file.

15. The apparatus of claim 11, further comprising the processing unit being configured to:
pack said first level linear hinting index and said second level non-sequential hinting index together in a single file with a media file descriptor; and
associating at least one separate media data file.

16. The apparatus of claim 11, further comprising the processing unit being configured to pack said first level linear hinting index and said second level non-sequential hinting index together in a single file with a media file descriptor, and at least one non-sequential media data file.

17. The apparatus of claim 11, further comprising the processing unit being configured to organize an index section is such that said first level linear hinting index has a linear organization corresponding to timing tick key values.

18. The apparatus of claim 11, further comprising the processing unit being configured to organize an index section is such that said second level hinting index has a non-sequential organization corresponding to timing tick key values.

19. The apparatus of claim 11, further comprising the processing unit being configured to organize an index section is such that said second level hinting index includes the special mark in the last of a sequential run of timing tick key values associated with its entries.

20. The apparatus of claim 11, further comprising the processing unit being configured to organize a data section is such that it accepts media data blocks associated in sequential runs of timing tick key values as its entries.

* * * * *